US010915527B2

(12) United States Patent
Erdmann et al.

(10) Patent No.: US 10,915,527 B2
(45) Date of Patent: Feb. 9, 2021

(54) PARALLEL SEARCH OF A PARTITIONED DATA SET EXTENDED (PDSE) IN PARALLEL

(71) Applicant: International Business Machines Corporation, Armonk, NY (US)

(72) Inventors: Derek L. Erdmann, Tucson, AZ (US); David C. Reed, Tucson, AZ (US); Thomas C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 758 days.

(21) Appl. No.: 15/616,445

(22) Filed: Jun. 7, 2017

(65) Prior Publication Data

US 2018/0357277 A1  Dec. 13, 2018

(51) Int. Cl.
*G06F 16/24* (2019.01)
*G06F 16/2453* (2019.01)
*G06F 16/22* (2019.01)
*G06F 16/2455* (2019.01)

(52) U.S. Cl.
CPC .... *G06F 16/24532* (2019.01); *G06F 16/2228* (2019.01); *G06F 16/2246* (2019.01); *G06F 16/2255* (2019.01); *G06F 16/2272* (2019.01); *G06F 16/24554* (2019.01)

(58) Field of Classification Search
CPC .......... G06F 16/24542; G06F 16/2272; G06F 16/2228; G06F 16/2246; G06F 16/2255; G06F 16/24532; G06F 16/24554
USPC ....................................... 707/718
See application file for complete search history.

(56) References Cited

U.S. PATENT DOCUMENTS

| | | | |
|---|---|---|---|
| 9,250,811 B1* | 2/2016 | Patiejunas | G06F 3/061 |
| 10,353,911 B2* | 7/2019 | Reynolds | G06F 16/248 |
| 2009/0157641 A1* | 6/2009 | Andersen | H04L 29/12132 |
| 2011/0066808 A1* | 3/2011 | Flynn | G06F 12/0246 |
| | | | 711/118 |
| 2013/0159258 A1 | 6/2013 | Belisle et al. | |
| 2013/0318507 A1* | 11/2013 | Breternitz, Jr. | G06F 8/52 |
| | | | 717/129 |
| 2015/0193345 A1 | 7/2015 | Helak et al. | |
| 2016/0140201 A1* | 5/2016 | Cowling | G06F 16/273 |
| | | | 707/614 |
| 2017/0109389 A1* | 4/2017 | Bardoliwalla | G06F 16/24539 |

(Continued)

OTHER PUBLICATIONS

Thomas Reed, "PDSE Nuts and Bolts", Share in Seattle 2015, Session: 16956, 49 pages.

*Primary Examiner* — Tamara T Kyle
*Assistant Examiner* — Raheem Hoffler
(74) *Attorney, Agent, or Firm* — Kunzler Bean & Adamson

(57) ABSTRACT

Methods that can parallel search a partitioned data set extended (PSDE) indexes are provided. One method includes managing a set of quick indexes in a memory device in which the set of quick indexes include references to storage locations for a subset of members of a PDSE stored in a set of long-term storage devices. The method further includes receiving a request to determine a storage location of a member of the PDSE and, in response to the request, searching the set of quick indexes to determine the storage location. Systems and computer program products for performing the above method are also provided.

20 Claims, 7 Drawing Sheets

(56) References Cited

U.S. PATENT DOCUMENTS

2017/0171114 A1\* 6/2017 Dao .................... H04L 67/2842
2018/0239808 A1\* 8/2018 Koochakzadeh ..... G06F 16/278

\* cited by examiner ns to storage locations for the members are
typically stored in a set of PDSE indexes that is stored in the
long-term memory along with the PDSE. Responsive to
receipt of input/output (I/O) requests (e.g., read requests,
write requests, read-write requests, etc.) directed to a PDSE,
the set of PDSE indexes can be searched to determine the
storage location for the members so that I/O operations (e.g.,
read operations, write operations, read-write operations,
etc.) corresponding to the I/O requests can be performed on
the members.

While a set of PDSE indexes is useful in determining
storage locations for the members of a PDSE, searching the
set of indexes requires I/O-to-long-term memory operations
(e.g., I/O-to-disk operations) that can consume a significant
amount of time and/or resources of a storage system and/or
network because the set of PDSE indexes are usually stored
in long-term memory. Accordingly, at least some previous
storage networks and/or systems may be consuming more
time and/or resources than they otherwise should be con-
suming when determining storage locations for members of
a PDSE.

BRIEF SUMMARY

Methods and systems that can parallel search a partitioned
data set extended (PSDE) are provided. One method
includes managing a set of quick indexes in a memory
device in which the set of quick indexes include references
to storage locations for a subset of members of a PDSE
stored in a set of long-term storage devices. The method
further includes receiving a request to determine a storage
location of a member of the PDSE and, in response to the
request, searching the set of quick indexes to determine the
storage location.

A system includes a management module that manages
references to storage locations in a set of quick indexes
including references to storage locations for a first subset of
members of a PDSE. The system further includes a quick
find module that searches the set of quick indexes to
determine a storage location for a member of the PDSE and
a search module that searches a set of PDSE indexes
including references to storage locations for the members of
the PDSE to determine the storage location for the member
of the PDSE. In various embodiments, at least a portion of
the search module and/or quick find module includes a set of
hardware circuits, a set of programmable hardware devices,
and/or executable code stored on a set of computer-readable
storage mediums.

Also disclosed are computer program products compris-
ing a computer-readable storage medium including program
instructions embodied therewith for searching sets of PSDE
indexes in parallel. Some program instructions are execut-
able by a processor and cause the processor to manage a set
of quick indexes in a memory device, the set of quick
indexes including references to storage locations for a subset
of members of a PDSE stored in a set of long-term storage
devices. The program instructions further cause the proces-
sor to receive a request to determine a storage location of a
member of the PDSE and, in response to the request, search
the set of quick indexes to determine the storage location.

BRIEF DESCRIPTION OF THE DRAWINGS

So that at least some advantages of the technology may be
readily understood, more particular descriptions of the
embodiments briefly described above are rendered by ref-
erence to specific embodiments that are illustrated in the
appended drawings. Understanding that the drawings
included herein only depict some embodiments, the embodi-
ments discussed herein are therefore not to be considered as
limiting the scope of the technology. That is, the embodi-
ments of the technology that are described and explained
herein are done with specificity and detail utilizing the
accompanying drawings, in which.

DETAILED DESCRIPTION

Figure 1:
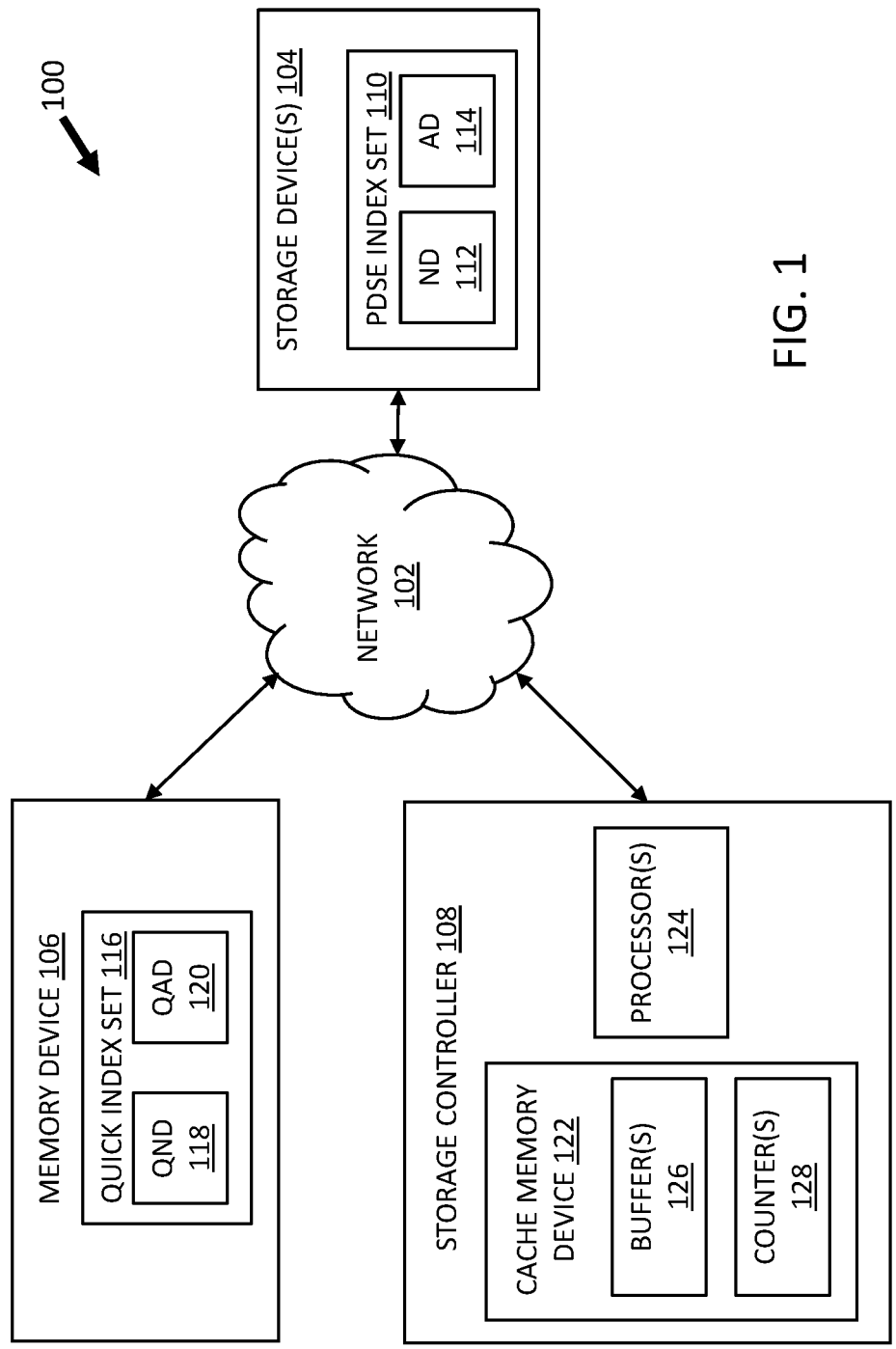
FIG. 1 is a diagram of one embodiment of a storage
system.

Disclosed herein are various embodiments providing
methods, systems, and computer program products that can
parallel search a partitioned data set extended (PSDE).
Notably, the language used in the present disclosure has
been principally selected for readability and instructional
purposes, and not to limit the scope of the subject matter
disclosed herein in any manner.

Reference throughout this specification to "one embodi-
ment," "an embodiment," or similar language means that a
particular feature, structure, or characteristic described in
connection with the embodiment is included in at least one
embodiment. Thus, appearances of the phrases "in one
embodiment," "in an embodiment," and similar language
throughout this specification may, but do not necessarily, all
refer to the same embodiment, but mean "one or more but
not all embodiments" unless expressly specified otherwise.
The terms "including," "comprising," "including," and
variations thereof mean "including but not limited to" unless
expressly specified otherwise. An enumerated listing of
items does not imply that any or all of the items are mutually exclusive and/or mutually inclusive, unless expressly specified otherwise. The terms "a," "an," and "the" also refer to "one or more," unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

A method that can parallel search a PDSE includes managing a set of quick indexes in a memory device in which the set of quick indexes include references to storage locations for a subset of members of a PDSE stored in a set of long-term storage devices. The method further includes receiving a request to determine a storage location of a member of the PDSE and, in response to the request, searching the set of quick indexes to determine the storage location.

In some embodiments, managing the set of quick indexes includes determining cache miss counts for the members of the PDSE and selectively adding references to storage locations to and/or selectively deleting references to storage locations from the set of quick indexes based on the cache miss counts. In additional or alternative embodiments, the method further includes maintaining a set of PDSE indexes in the set of long-term storage devices, the set of PDSE indexes including references to storage locations for the members of the PDSE and, in further response to the request, searching the set of PDSE indexes in parallel while searching the set of quick indexes to determine the storage location.

In various embodiments, the method includes ceasing to search the set of PDSE indexes for the storage location in response to determining the storage location of the member via the set of quick indexes prior to determining the storage location via the set of PDSE indexes and/or ceasing to search the set of quick indexes for the storage location in response to locating the storage location of the member in the set of PDSE indexes prior to locating the storage location in the set of quick indexes. In additional or alternative embodiments, the method includes, in response to not determining the storage location via the set of quick indexes, ceasing to search the set of quick indexes for the storage location and continuing to search the set of PDSE indexes to determine the storage location.

A system that can parallel search a PDSE includes a management module that manages references to storage locations in a set of quick indexes including references to storage locations for a first subset of members of a PDSE. The system further includes a quick find module that searches the set of quick indexes to determine a storage location for a member of the PDSE and a search module that searches a set of PDSE indexes including references to storage locations for the members of the PDSE to determine the storage location for the member of the PDSE. In various embodiments, at least a portion of the search module and/or quick find module includes a set of hardware circuits, a set of programmable hardware devices, and/or executable code stored on a set of computer-readable storage mediums.

The system, in some embodiments, further includes a memory device that stores the set of quick indexes and a set of storage devices. The set of storage devices store the members of the PDSE and the set of PDSE indexes.

The set of PDSE indexes and the set of quick indexes can include different types of indexes. In some embodiments, the set of PDSE indexes includes a set of b-tree indexes and the set of quick indexes includes a set of hash tables.

A set of b-tree indexes can include a name directory and/or an attribute directory. Further, a set of hash tables can include a quick name directory and/or a quick attribute directory.

In some embodiments, the search module and the quick find module begin their searches in parallel. The system, in various embodiments, further includes an interrupt module that, in response to the quick find module determining the storage location of the member in the set of quick indexes prior to the search module determining the storage location in the set of PDSE indexes, interrupts the search module so that the search module ceases searching for the storage location in the set of PDSE indexes and/or, in response to the search module determining the storage location in the set of PDSE indexes prior to the quick find module determining the storage location in the set of quick indexes, interrupts the quick find module so that the quick find module ceases searching for the storage location in the set of quick indexes.

In additional or alternative embodiments, in response to the quick find module not determining the storage location in the set of quick indexes, the quick find module ceases searching for the storage location and the search module continues searching the set of PDSE indexes to determine the storage location.

The system, in various embodiments, further includes a cache memory device that stores a second subset of members in which managing the references to the storage locations includes selectively adding references to storage locations to and selectively deleting references to storage locations from the set of quick indexes based on cache misses for the members of the PDSE. In additional or alternative embodiments, the system further includes a set of counters associated with the members. Here, a counter is incremented in response to a cache miss for a corresponding member and references to storage locations are selectively added and selectively deleted based on relative incremented counts.

Also disclosed are computer program products comprising a computer-readable storage medium including program instructions embodied therewith that can parallel search a PDSE. Some program instructions are executable by a processor and cause the processor to manage a set of quick indexes in a memory device, the set of quick indexes including references to storage locations for a subset of members of a PDSE stored in a set of long-term storage devices. The program instructions further cause the processor to receive a request to determine a storage location of a member of the PDSE and, in response to the request, search the set of quick indexes to determine the storage location.

In some embodiments, the program instructions for managing the set of quick indexes include program instructions that further cause the processor to determine cache miss counts for the members of the PDSE and selectively add references to storage locations to and selectively delete references to storage locations from the set of quick indexes based on the cache miss counts. In additional or alternative embodiments, the program instructions further cause the processor to maintain a set of PDSE indexes in the set of long-term storage devices in which the set of PDSE indexes include references to storage locations for the members of the PDSE and, in further response to the request, search the set of PDSE indexes in parallel while searching the set of quick indexes to determine the storage location.

The program instructions, in various embodiments, further cause the processor to, in response to determining the storage location of the member via the set of quick indexes prior to determining the storage location via the set of PDSE indexes, cease searching the set of PDSE indexes for the storage location and/or, in response to locating the storage location of the member in the set of PDSE indexes prior to locating the storage location in the set of quick indexes, cease searching the set of quick indexes for the storage location. In additional or alternative embodiments, the program instructions further cause the processor to, in response to not determining the storage location via the set of quick indexes, cease searching the set of quick indexes for the storage location and continue searching the set of PDSE indexes to determine the storage location.

The description of elements in each figure below may refer to elements of proceeding figures. For instance, like numbers can refer to similar elements in all figures, including alternate embodiments of similar elements.

With reference now to the figures, FIG. 1 is a diagram illustrating one embodiment of a storage system 100, which can also be considered a storage network. At least in the illustrated embodiment, the storage system 100 includes, among other components, a network 102 coupling a set of storage devices 104, a memory device 106, and a storage controller 108 to one another.

The network 102 may be any suitable wired and/or wireless network 102 (e.g., public and/or private computer networks in any number and/or configuration (e.g., the Internet, an intranet, a cloud network, etc.)) that is known or developed in the future that enables the set of storage devices 104, memory device 106, and storage controller 108 to be coupled to and/or in communication with one another and/or to share resources. In various embodiments, the network 102 can comprise a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of sharing resources.

A storage device 104 may be any suitable type of storage device that is known or developed in the future that can store computer-useable data. In various embodiments, a storage device 104 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device.

In some embodiments, a storage device 104 is implemented as a direct-access storage device (DASD). A storage device 104, in further embodiments, may include non-transitory memory such as, for example, flash memory (e.g., a solid-state devices (SSD) or other non-volatile storage devices that store persistent data), a dynamic random access memory (DRAM) device, an enhanced dynamic random access memory (EDRAM) device, a static random access memory (SRAM) device, a hard disk drive (HDD), a near-line drive, tape drive (e.g., magnetic and/or virtual), and/or other type(s) (e.g., non-volatile and/or persistent) of memory devices, etc. that are possible and contemplated herein.

A storage device 104, in various embodiments, may include non-volatile/persistent hardware and/or software configured to perform long-term data storage operations, including, but not limited to, data archiving, data backup, data mirroring, replicating data, etc. For instance, a storage device 104 may include non-volatile and/or persistent hardware and/or software to perform long-term data storage operations, which may include write operations, read operations, read-write operations, etc., among other operations.

In some embodiments, a storage device 104 stores objects (e.g., data, executable programs, source program libraries, and/or Job Control Language, etc.) organized and/or arranged in a PDSE structure and/or configuration (also simply referred to herein as a PDSE). The PDSE may be any partitioned data set that may not pre-allocate directory pages or chunks when defined so that it does not run out of directory chunks if not enough were specified. A chunk may include four kilobytes (4K) of space, although other sizes are possible and contemplated herein. In one embodiment, the PDSE may be provided, organized, and/or manufactured by IBM® Corporation of Armonk, N.Y.

Objects in a PDSE structure is organized and/or partitioned into a set of members, which can include any quantity of members greater than or equal to zero (0) members. In some embodiments, a PSDE may include a maximum of 522,236 members, although other quantities are possible and contemplated herein. Space from deleted or moved members can be automatically reused for new and/or added members without compressing the PDSE to remove "wasted," "dead," or otherwise freed-up space.

A member of a PDSE can store a quantity of records up to about 15,728,639 records, although other quantities are possible and contemplated herein. A PDSE can include a quantity of extents in the range of zero (0) extents to about one hundred twenty-three (123) extents (e.g., a continuous area of space on a storage volume, occupied by or reserved for a specific data set), although other quantities are possible and contemplated herein.

In various embodiments, each member includes a unique member name and/or other type of identifier. A member name may include any size and, in some embodiments, includes a size of about eight (8) bytes, although other sizes are possible and contemplated herein.

Each member name may include an associated File Serial Number (FSN), which may be an arbitrary value and/or number and can be considered the real identifier for a member.

Further, each member includes a set of attributes that can be used to identify the storage location of the member. An attribute may include a reference to and/or an identifier of the storage location of the member block in the PDSE and/or storage device(s) 104. An attribute may further include metadata (e.g., creation time, time of last modification, size, etc.) corresponding to the member.

As shown, the storage device(s) 104 store a set of PDSE indexes 110 (also simply referred individually, in various groups, or collectively as PDSE index or indexes 110) including a name directory (ND) 112 and an attribute directory (AD) 114 that can be used to determine the storage location of a member, similar to conventional PDSE techniques. The ND 112 indexes each FSN for the members of a PDSE, which is typically a b-tree or b*-tree index. The member name can provide a key for the b-tree/b*-tree function of the ND 112, which computes/determines the FSN that corresponds to the member name associated with the member.

The AD 114 indexes the attribute(s) of each member of the PDSE, which is typically a b-tree or b*-tree index. The FSN computed/determined by the ND 112 can provide a key for the b-tree/b*-tree function of the AD 114, which computes/determines the storage location that corresponds to the FSN, which in turn corresponds to the member name associated with the member. In this manner, the storage location of the member can be identified/determined utilizing a PDSE index 110.

A memory device 106 may include any suitable type of computer-useable memory that is known or developed in the future that can store computer-readable data. In one embodiment, the memory device 106 includes a RAM device, among other suitable types of memory that are contemplated herein.

In various embodiments, a memory device 106 stores the set of quick indexes 116 (also simply referred individually, in various groups, or collectively as quick index or indexes 116), which includes a quick name directory (QND) 118 and a quick attribute directory (QAD) 120. A set of quick indexes 116 may be any suitable type of index, directory, table, chart, map, and/or other reference mechanism that is known or developed in the future allows two or more items to be correlated and/or associated with one another. In one embodiment, the set of quick indexes 116 comprises a set of hash tables.

The QND 118 may be any type of directory, index, table, chart, map, and/or other reference mechanism that is known or developed in the future. In one embodiment, the QND 118 is a hash table, among other possible types of directory that can reference the member names.

In various embodiments, a QND 118 indexes the FSN for a subset of the members stored in the PDSE and/or storage device(s) 104, which can be any suitable percentage or ratio of the total number of members of a PDSE. In various embodiments, a QND 118 may include a maximum of about five percent (5%) of the total quantity of members of a PDSE, although other percentages/ratios and/or maximums are possible and contemplated herein.

The QAD 120 may be any type of directory, index, table, chart, map, and/or other reference mechanism that is known or developed in the future. In one embodiment, the QAD 120 is a hash table, among other possible types of directory that can reference the member attributes.

In various embodiments, a QAD 120 includes the member attribute(s) of the same subset of members included in a corresponding QND 118 (and vice-versa). As such, corresponding QNDs 118 and QADs 120 include the same percentage/ratio of the total number of members of a PDSE.

Notably, because a ND 112 includes the member name of each member of a PDSE and an AD 114 includes the member attribute(s) of each member of the PDSE, QND 118 and QAD 120 can be considered as including subsets of the FSNs included in the ND 112 and the member attribute(s) included in the AD 114, respectively. Further, a quick index 116 can also be considered as including FSNs and member attribute(s) for a subset of the members included in a PDSE index 112.

The set of quick indexes 116 can be utilized to determine the storage location of the subset of members included therein. For example, a member name may comprise a key for a hash function on the QND 118 that computes/determines a FSN corresponding to the member name. The FSN computed/determined in the QND 118, in turn, can be used as a key for a hash function on the QAD 120 that computes/determines the storage location associated with the FSN, which in turn corresponds to the member name associated with the member. In this manner, the storage location of the member can be identified/determined utilizing a quick index 116.

A storage controller 108 includes, among other components, a cache memory device 122 and a set of processors 124. A cache memory device 122 may be any type of memory device (e.g., hardware and/or software) that is known or developed in the future that can store/buffer data for retrieval when an input/output (I/O) request (e.g., write request, read request, and/or read-write request, etc.) is received at storage system 100. In various embodiments, a cache memory device 122 may include, among other components, a buffer memory 126 (or simply, buffer 126) and a set of counters 128.

A buffer memory 126 may be any suitable type of memory device that is known or developed in the future. Further, a buffer memory 126 can store/buffer a subset of the members of a PDSE stored in the storage device(s) 104 so that the member(s) can be accessed without being retrieved from the storage device(s) 104.

The counter(s) 128 may be any suitable type of counter that is known or developed in the future that can track one or more events in the storage system 100. In various embodiments, the set of counters 128 tracks the number of cache misses for each member of a PDSE in the storage system 100. For instance, each instance in which an I/O request is received by the storage controller 108 for a particular member that is not stored/buffered in the buffer memory 126, the counter associated with the particular member is incremented.

A set of counters 128 may include any suitable quantity of counters for tracking cache misses of members of a PDSE. In some embodiments, the quantity of counters 128 corresponds to the total number of members in a PDSE. In further embodiments, the quantity of counters 128 may correspond to a subset of the total number of members of a PDSE (e.g., the members that are currently being stored in the storage device(s) 104).

Figure 2A:
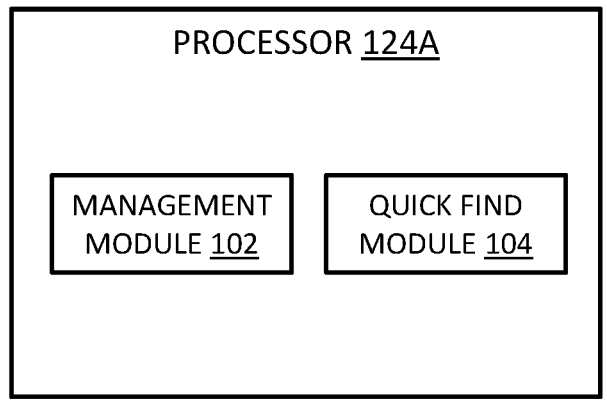
FIGS. 2A through 2C are block diagrams illustrating
various embodiments of a processor included in the storage
system of FIG. 1.

The processor(s) 124 may include hardware and/or software for executing instructions in one or more applications or modules that cause the processor(s) 124 to perform operations for searching indexes to determine the storage location of a member of a PDSE. With reference now to FIG. 2A, FIG. 2A is a diagram of one embodiment of a processor 124A that can search a set of quick indexes 116 to determine the storage location for a subset of members of a PDSE. At least in the illustrated embodiment, processor 124A includes, among other components, a management module 202 and a quick find module 204.

A management module 202, in various embodiments, includes hardware and/or software to manage a set of quick indexes 116. In various embodiments, a management module 202 periodically adds and/or deletes references to members of a PDSE, in which periodically can include a predetermined amount of time, a predetermined total number of increments for the set of counters, and/or a predetermined number of I/O requests received by the storage controller 108, etc., among other periodic events and/or occurrences that are possible and contemplated herein.

In some embodiments, a management module 202 can add and/or delete members from the quick index 116 to ensure that the maximum amount/percentage of members in the quick index 116 is not exceeded. The quantity and/or percentage may be any quantity and/or percentage of the total number of members of a PDSE, as discussed elsewhere herein.

A member may be added to and/or deleted from a quick index 116 based on any suitable criteria or criterion for a particular storage application. In some embodiments, a is added to and/or deleted from a quick index 116 based on the relative incremented counts in the set of counters 128. That is, a QND 118 and a QAD 120 are periodically updated based on the relative cache miss counts for the members of a PDSE.

In some embodiments, a counter 128 is incremented upon each occurrence of a cache miss for a corresponding member. For instance, a counter corresponding to a particular member may be incremented each time that an I/O operation retrieves the particular member from the storage device(s) 104.

In some embodiments, a management module 202 ranks the members based on their respective cache miss counts and selects a quantity or percentage "n" of members including the highest quantity of cache miss counts for inclusion in the quick index 116. In additional or alternative embodiments, a management module 202 may implement a promotion/demotion scheme to manage the members included in a quick index 116.

In one embodiment, the management module 202 ranks the members in the quick index 116 based on their respective cache miss counts and selects a predetermined quantity or percentage of members in the quick index 116 including the highest quantity of cache miss counts to remain in the quick index 116. Further, the management module 202 can select a predetermined quantity or percentage of members including the lowest quantity of cache miss counts in the quick index 116 for removal from the quick index 116. Moreover, the management module 202 may replace the members that were deleted from the quick index with members that include the highest relative cache miss counts compared to other members. Here, a replacement member may be a member that was not in the previous iteration of the quick index 116 and include a relatively high cache miss count compared to other members that are not already included in the next iteration and/or a member that was deleted from the quick index 116 because its cache miss count was relatively low compared to other members in the quick index 116 being carried over to the next iteration and relatively high compared to members that are not already included in the next iteration.

A quick find module 204, in various embodiments, includes hardware and/or software to search a set of quick indexes 116 to determine the storage location of a member of a PDSE that may be included in the quick index 116. In some embodiments, a quick find module 204 performs a hash function on a QND 118 using a member name associated with the member as a key to compute the FSN corresponding to the member name, as discussed elsewhere herein. Further, the quick find module 204 performs a hash function on a QAD 120 using the computed FSN as a key to compute the attribute(s) of the member that reference the storage location and/or metadata for the member, as further discussed elsewhere herein.

In this manner, a quick find module 204 can use a quick index 116 stored in, for example, RAM to determine the storage location of a member of a PDSE. Using a quick index 116 stored in RAM can be more efficient than using a PSDE index 110 stored in the storage device(s) 104 because an I/O operation to, for example, a storage disk may be avoided, the size of the quick index 116 is smaller than (e.g., a subset of) the PDES index and may require less time to search, and/or a hash table, for example, can be a faster/more efficient technique to perform an index search compare to, for example, a b-tree/b*-tree, provided that the subset of members in the quick index 116 includes the desired member. In some embodiments, a quick find module 204 may cease searching a quick find module 204 in response to not finding and/or not determining the storage location of a particular member of a PDSE.

Figure 2B:
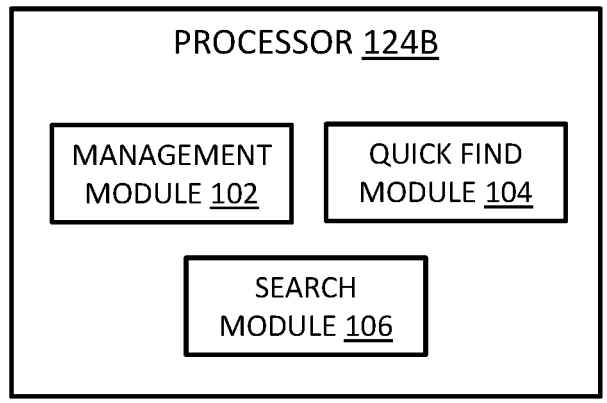

Referring now to FIG. 2B, FIG. 2B is a diagram of one embodiment of a processor 124B that can search a set of quick indexes 116 and a set of PDSE indexes 110 to determine the storage location for the same member of a PDSE. At least in the illustrated embodiment, the processor 124B includes, among other components, a management module 202 and a quick find module 204 similar to the processor 124A in FIG. 2A, and further includes a search module 206.

Similar to conventional PDSE techniques, a set of PDSE indexes 110 may be maintained in the storage device(s) 104. For instance, the ND 112 and AD 114 may be updated as members are added and deleted from the PDSE and/or the storage device (s) 104.

A search module 206, in various embodiments, includes hardware and/or software to search a set of PDSE indexes 110 stored in the storage device(s) 104 to determine the storage location for members of a PDSE. In some embodiments, a search module 206 uses a member name associated with the member as a key in the ND 112 (e.g., a b-tree, b*-tree, etc.) to determine the FSN corresponding to the member name, similar to conventional PDSE techniques. The search module 206 uses the FSN determined in the ND 112 as key in the AD 112 (e.g., a b-tree, b*-tree, etc.) to determine the attribute(s) of the member that reference the storage location and/or metadata for the member.

In various embodiments, a processor 124B may coordinate the operations of the quick find module 204 and the search module 206 so that the quick find module 204 and the search module 206 begin their respective searches for the storage location of the same member at the same time, about the same time, at substantially the same time, and/or within a predetermined amount of time to determine the storage location of the member. In some embodiments, a processor 124B may coordinate the operations of the quick find module 204 and the search module 206 so that the quick find module 204 and the search module 206 perform their respective searches for the storage location of the same member in parallel or substantially in parallel.

In some embodiments, a quick find module 204 may further cease searching a quick find module 204 in response to not finding and/or not determining the storage location of a particular member of a PDSE. Further, in response to not locating the storage location of a member of the PDSE in the quick index 116, the quick find module 204 may notify a user that information corresponding to this particular member is not located in the quick index 116.

In additional or alternative embodiments, a search module 206 may continue searching a PDSE index 110 for the storage location of a member of a PDSE in response to a quick find module 204 ceasing to search a quick index 116. For instance, the search module 206 will continue to search for the storage location of the same member that a quick find module 204 is unable to locate and/or determine the storage location for in a quick index 116.

Figure 2C:
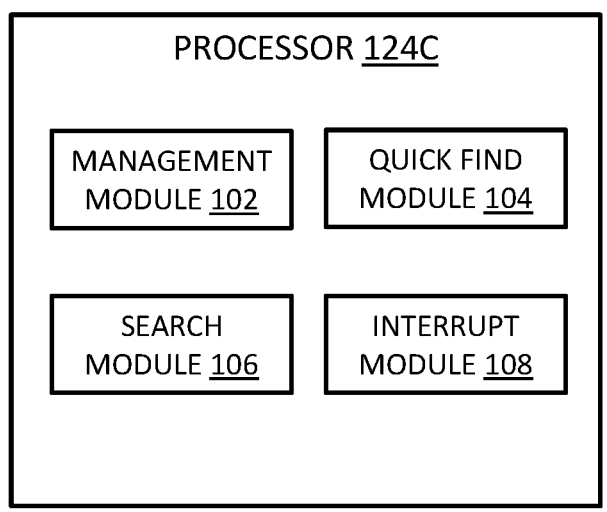

With reference to FIG. 2C, FIG. 2C is a diagram of another embodiment of a processor 124C that can search a set of quick indexes 116 and a set of PDSE indexes 110 to determine the storage location for the same member of a PDSE. At least in the illustrated embodiment, the processor 124C includes, among other components, a management module 202, a quick find module 204, and a search module 206 similar to the processor 124B in FIG. 2B, and further includes an interrupt module 208.

An interrupt module 208, in various embodiments, includes hardware and/or software to interrupt the search of the set of quick indexes 116 and/or the set of PDSE indexes 110. For instance, the interrupt module 208 can cause the quick find module 204 and/or the search module 206 to cease searching the quick index 116 and/or the PDSE index 110, respectively, in response to detecting one or more predetermined events and/or occurrences.

In one embodiment, a predetermined event/occurrence includes the quick find module 204 finding and/or determining the storage location of a member in the quick index 116 prior to the search module 206 finding and/or determining the storage location of the same member in the PDSE index 110. In response to detecting this predetermined event/occurrence, the interrupt module 208 can interrupt the search of the PDSE index 110 being performed by the search module 206 (which search may be being performed in parallel with the search of the quick find module 204, as discussed elsewhere herein) such that the search module 206 ceases to search the PDSE index 110 for the storage location of the member.

In an additional or alternative embodiment, a predetermined event/occurrence includes the search module 206 finding and/or determining the storage location of a member in the PDSE index 110 prior to the quick find module 204 finding and/or determining the storage location of the same member in the quick index 116. In response to detection of this predetermined event/occurrence, the interrupt module 208 can interrupt the search of the quick index 116 being performed by the quick find module 204 (which search may be being performed in parallel with the search of the PDSE index 110 by the search module 206, as discussed elsewhere herein) such that the quick find module 204 ceases to search the quick index 116 for the storage location of the member.

Figure 3:
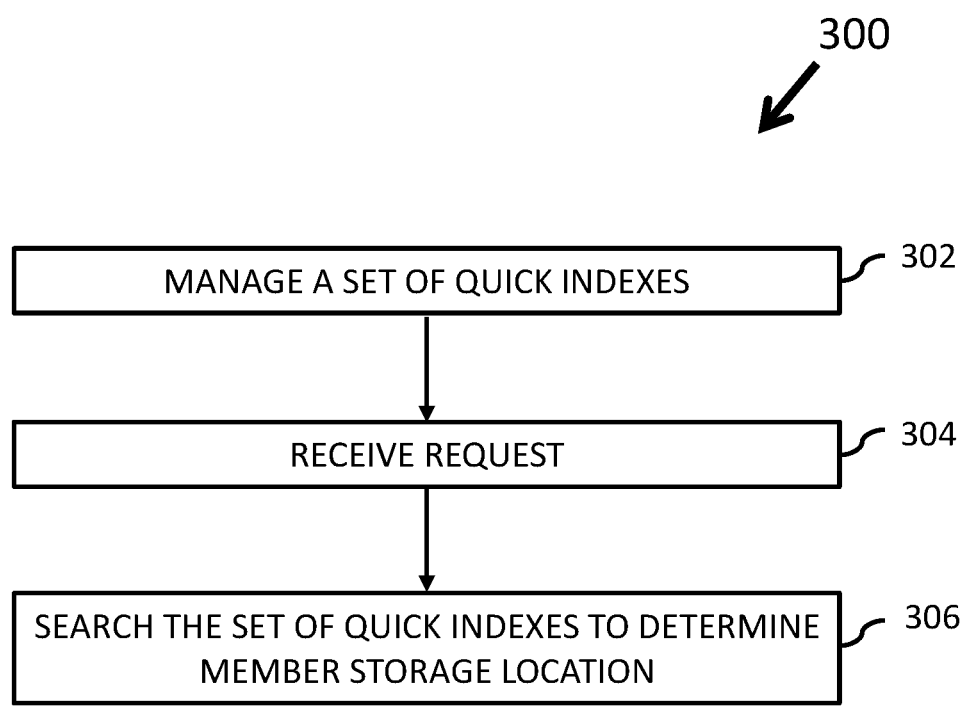
FIG. 3 is a schematic flow chart diagram illustrating one
embodiment of a method for searching a quick index to
determine storage locations for members of a partitioned
data set extended (PDSE)

With reference now to FIG. 3, FIG. 3 is a schematic flow chart diagram illustrating one embodiment of a method 300 for searching a quick index 116 to determine storage locations for members of a PDSE. At least in the illustrated embodiment, the method 300 begins by a processor 124A, 124B, and/or 124C (also simply referred individually, in various groups, or collectively as processor(s) 124) managing a set of quick indexes 116 in a memory device 106 (block 302), which may be performed in any manner as discussed elsewhere herein. In some embodiments, the set of quick indexes 116 includes references to storage locations for a subset of members of a PDSE stored in a set of long-term storage devices 104.

The processor 124 can receive a request to determine a storage location of a member of the PDSE (block 304). The request may be a direct request to determine the storage location and/or may be ancillary to or a part of an I/O request that causes a need and/or desire to locate/determine the storage location of the member to perform an I/O operation in response to an I/O request.

In response to receiving the request, the processor 124 searches a set of quick indexes 116 to determine the storage location of the member (block 306). The set of quick indexes 116, in some embodiments, includes a set of hash tables and the processor 124 may search the hash table(s) in any suitable manner, as discussed elsewhere herein.

Figure 4:
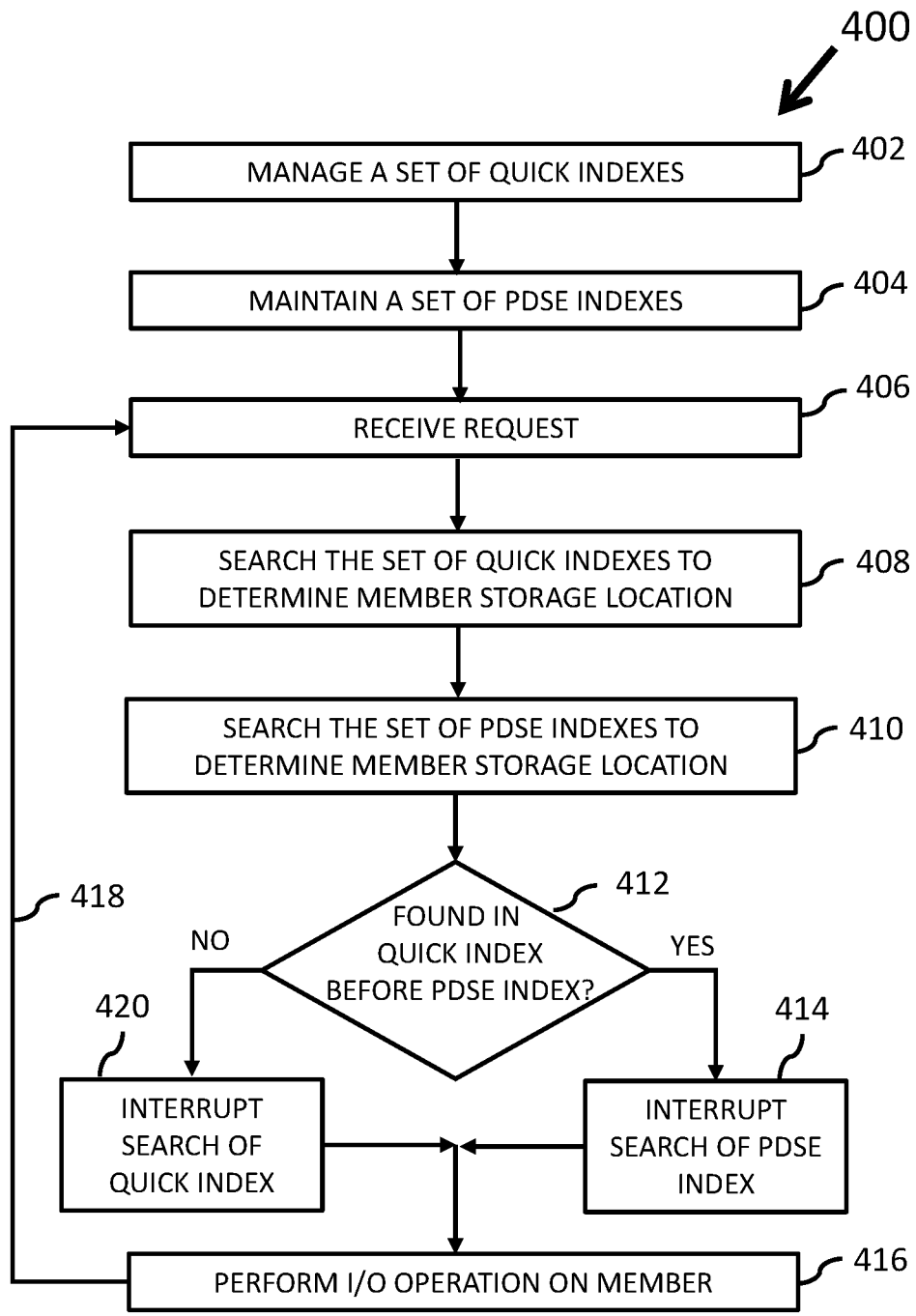
FIG. 4 is schematic flow chart diagram illustrating an
embodiment of a method for searching a quick index and a
PDSE index to determine storage locations for members of
a PDSE.

Referring now to FIG. 4, FIG. 4 is a schematic flow chart diagram illustrating an embodiment of a method 400 for searching a quick index 116 and a PDSE index 110 to determine storage locations for members of a PDSE. At least in the illustrated embodiment, the method 400 begins by a processor 124 managing a set of quick indexes 116 in a memory device 106 (block 402), which may be performed in any manner as discussed elsewhere herein. In some embodiments, the set of quick indexes 116 includes references to storage locations for a subset of members of a PDSE stored in a set of long-term storage devices 104.

Further, a set of PDSE indexes 110 is maintained in a set of storage devices 104 (block 404). The set of PDSE indexes 110 includes references to storage locations for each of the members of the PDSE stored in the storage device(s) 104.

The processor 124 can receive a request to determine a storage location of a member of the PDSE (block 406). The request may be a direct request to determine the storage location and/or may be ancillary to or a part of an I/O request that causes a need and/or desire to locate/determine the storage location of the member to perform an I/O operation in response to an I/O request.

In response to receiving the request, the processor 124 search a set of quick indexes 116 to determine the storage location of the member (block 408). The set of quick indexes 116, in some embodiments, includes a set of hash table(s) and the processor 124 may search the hash tables in any suitable manner, as discussed elsewhere herein.

In further response to receiving the request, the PDSE indexes 110 are searched to determine the storage location of the same member being searched in the quick index 116 (block 410). The set of PDSE indexes 110, in some embodiments, includes a set of b-tree/b*-tree indexes and may be searched in any suitable manner, as discussed elsewhere herein.

The processor 124 can determine if the storage location is found/determined in the quick index 116 prior to being found/determined in the PDSE index 110 (block 412). In response to the storage location being found/determined in the quick index prior to being found/determined in the PDSE index (e.g., a YES in block 412), search of the PDSE index 110 is interrupted (block 414). In some embodiments, interrupting the search of the PDSE index 110 includes the processor 124 ceasing to search the PDSE index 110 for the storage location of the member.

In response to determining the storage location for the member, the processor 124 performs the I/O operation on the member (block 416). The processor 124 may return to block 406 upon receiving a subsequent request (return 418).

In response to the storage location being found in the PDSE index 110 prior to being found/determined in the quick index 116 or not being found/determined in the quick index 116 (e.g., a NO in block 412), searching the quick index 116 by the processor 124 is interrupted (block 420). In some embodiments, interrupting the search of the quick index 116 includes the processor 124 ceasing to search the quick index 116 for the storage location of the member.

In additional or alternative embodiments, the processor 124 may continue searching the PSDE index for the storage location of the member in response to and/or upon determining that search of the quick index 116 is interrupted for this particular member (block 422). In response to determining the storage location for the member, the processor 124 perform the I/O operation (block 416). The processor 124 may return to block 406 upon receiving a subsequent request (return 418).

Figure 5:
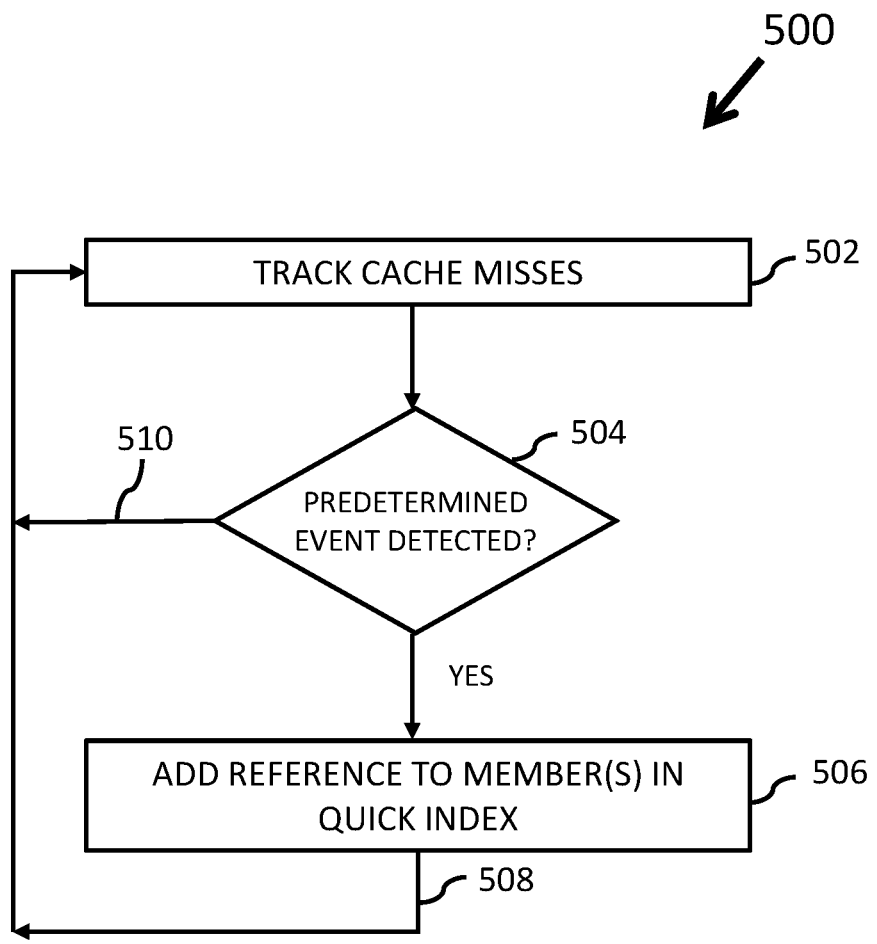
FIG. 5 is a schematic flow chart diagram illustrating one
embodiment of a method for managing a quick index.

With reference now to FIG. 5, FIG. 5 is a schematic flow chart diagram illustrating one embodiment of a method 500 for managing a quick index 116. At least in the illustrated embodiment, method 500 begins by a processor 124 tracking cache misses for members of a PDSE (block 502). The cache misses may be tracked using any suitable technique that is known or developed in the future. In some embodiments, the cache miss counts are tracked utilizing a set of counters 128, as discussed elsewhere herein.

The processor 124 can determine the occurrence of a predetermined event (block 504). A predetermined event may include expiration of a predetermined amount of time, a predetermined total number of increments for the set of counters, and/or a predetermined number of I/O requests received by the storage controller 108, etc., among other periodic events and/or occurrences, as discussed elsewhere herein.

In response to the occurrence of a predetermined event (e.g., a YES in block 504), the processor 124 can selectively add reference to one or more members to the quick index 116 (block 506). Reference to the one or more member may be selectively added in accordance with the various techniques (e.g., ranking, etc.) discussed elsewhere herein. Further, any quantity and/or percentage of members may be added to the quick index 116, as discussed elsewhere herein. The processor 124 can continue tracking the cache misses (return 508) and repeat method 500.

In response to the predetermined event not occurring (e.g., a NO in block 504), the processor 124 can continue tracking the cache misses (return 510). The processor 124 may then repeat the method 500.

Figure 6:
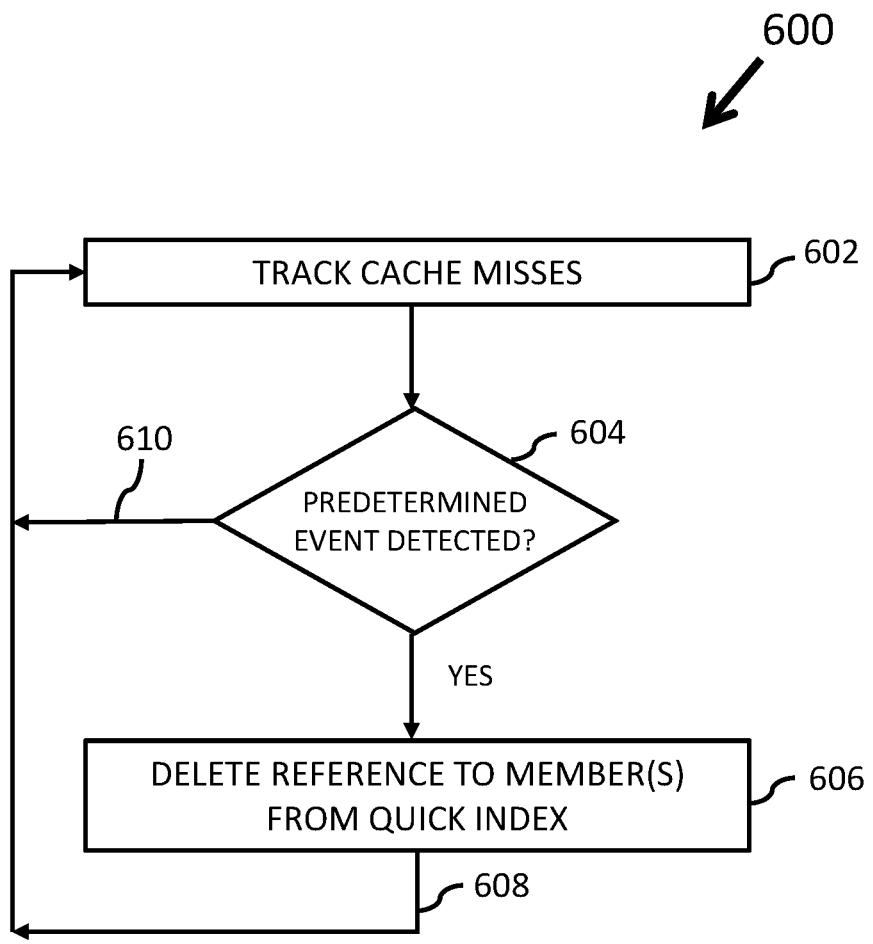
FIG. 6 is a schematic flow chart diagram illustrating
another embodiment of a method for managing a quick
index.

Referring to FIG. 6, FIG. 6 is a schematic flow chart diagram illustrating one embodiment of a method 600 for managing a quick index 116. At least in the illustrated embodiment, method 600 begins by a processor 124 tracking cache misses for members of a PDSE (block 602). The cache misses may be tracked using any suitable technique that is known or developed in the future. In some embodiments, the cache miss counts are tracked utilizing a set of counters 128, as discussed elsewhere herein.

The processor 124 can determine the occurrence of a predetermined event (block 604). A predetermined event may include expiration of a predetermined amount of time, a predetermined total number of increments for the set of counters, and/or a predetermined number of I/O requests received by the storage controller 108, etc., among other periodic events and/or occurrences, as discussed elsewhere herein.

In response to the occurrence of a predetermined event (e.g., a YES in block 604), the processor 124 can selectively delete reference to one or more members to the quick index 116 (block 606). Reference to the one or more member may be selectively deleted or removed in accordance with the various techniques (e.g., ranking, etc.) discussed elsewhere herein. Further, any quantity and/or percentage of members may be deleted/removed from the quick index 116, as discussed elsewhere herein. The processor 124 can continue tracking the cache misses (return 608) and repeat method 600.

In response to the predetermined event not occurring (e.g., a NO in block 604), the processor 124 can continue tracking the cache misses (return 610). The processor 124 may then repeat the method 600.

The various embodiments disclosed herein provide one or more improvements over conventional techniques to determine storage locations for members of a PDSE. At least one improvement relates to the amount of time and/or efficiency with which the various embodiments can determine the storage locations. For example, because a reference to the storage location for a member may be located on a subset of a PDSE index, the storage location may be determined/identified faster than a conventional PDSE index since the subset includes a smaller quantity of data and/or members that need to be searched to determine the storage location, which can result in less time needed to perform the search. In another non-limiting example, because the subset of a PDSE index can be located in memory (e.g., RAM, etc.) instead of in long-term memory, I/O-to-disk operations may be eliminated or at least reduced, which can conserve time and/or resources of a storage system and/or network.

The embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claim is:
1. A system, comprising:
 a management module that manages references to storage locations in a set of quick indexes, the set of quick indexes including references to storage locations for a subset of members of a partitioned data set extended (PDSE) that includes a plurality of members;

a quick find module that:
   searches the set of quick indexes to determine whether a member in the plurality of members of the PDSE is included in the subset of members of the PDSE, and
   in response to determining that the member of the PDSE is included in the subset of members of the PDSE, determines a storage location for the member of the PDSE;
a search module that, in parallel with the quick find module searching the set of quick indexes, searches a set of PDSE indexes including references to storage locations for all of the members in the plurality of members of the PDSE to determine the storage location for the member of the PDSE; and
an interrupt module that:
   interrupts the search module from continuing to search for the storage location of the member in the set of PDSE indexes in response to the quick find module determining the storage location of the member in the set of quick indexes prior to the search module determining the storage location of the member in the set of PDSE indexes, and
   interrupts the quick find module from continuing to search for the storage location of the member in the set of quick indexes in response to the search module determining the storage location of the member in the set of PDSE indexes prior to the quick find module determining the storage location of the member in the set of quick indexes,
wherein:
   the set of quick indexes is stored in a storage device on a storage controller,
   the set of PDSE indexes is stored in a long-term storage device,
   the storage device includes a faster operational speed than the storage device, and
   at least a portion of said modules comprise one or more of a set of hardware circuits, a set of programmable hardware devices, and executable code stored on a set of computer-readable storage media.

2. The system of claim 1, wherein:
the members of the PDSE are stored on the second storage device.

3. The system of claim 2, wherein the set of PDSE indexes and the set of quick indexes include different types of indexes.

4. The system of claim 3, wherein:
the set of PDSE indexes comprises a set of b-tree indexes; and
the set of quick indexes comprises a set of hash tables.

5. The system of claim 4, wherein:
the set of b-tree indexes comprises:
   a name directory, and
   an attribute directory; and
the set of hash tables comprises:
   a quick name directory, and
   a quick attribute directory.

6. The system of claim 1, wherein:
in response to the quick find module not determining the storage location of the member in the set of quick indexes:
   the quick find module ceases searching the set of quick indexes for the storage location of the member, and
   the search module continues searching the set of PD SE indexes to determine the storage location of the member.

7. The system of claim 1, further comprising:
a cache memory device that stores the subset of members of the PDSE,
wherein:
   members of the PDSE are selectively stored to and selectively deleted from the cache memory device based on cache misses for the plurality of members of the PDSE, and
   managing the references to the storage locations in the quick index includes:
      adding a reference to a storage location in the quick index for each member of the PDSE stored in the cache memory device, and
      deleting the reference to the storage location in the quick index for each member of the PDSE deleted from the cache memory device.

8. The system of claim 7, further comprising:
a set of counters associated with each of the plurality of members of the PDSE,
wherein:
   a respective counter for a corresponding member of the PDSE is incremented in response to each cache miss for the corresponding member of the PDSE,
   the members of the PDSE are selectively stored to the cache memory in response to the respective counter for each corresponding member of the PDSE being incremented relatively greater than the respective counters for other members of the PDSE,
   the members of the PDSE are selectively deleted from the cache memory in response to the respective counter for each corresponding member of the PDSE being incremented relatively less than the respective counters for other members of the PDSE, and
   references to the storage locations for the members of the PDSE in the quick index are selectively added to and selectively deleted from the quick index based on the relative incremented counts.

9. The system of claim 1, wherein the storage device on the storage controller comprises a cache memory device.

10. The system of claim 9, wherein the long-term storage device comprises one of:
a direct-access storage device (DASD);
a flash memory device;
a dynamic random-access memory (DRAM) device;
an enhanced DRAM (EDRAM);
a static random-access memory (SRAM) device;
a hard disk drive (HDD);
a near-line drive; and
a tape drive.

11. A method, comprising:
managing, by a processor, a set of quick indexes stored in a memory device on a storage controller, the set of quick indexes including references to storage locations for a subset of members of a partitioned data set extended (PDSE) that includes a plurality of members stored in a set of long-term storage devices;
receiving an input/output (I/O) request directed to a member of the PDSE;
in response to the I/O request:
   searching the set of quick indexes to determine whether the member of the PDSE is included in the subset of members of the PDSE, determining a storage location for the member of the PDSE in response to determining that the member of the PDSE is included in the subset of members of the PDSE, and searching a set of PDSE indexes including references to storage locations for all of the members of the PDSE, in parallel with searching the set of quick indexes, to determine the storage location for the member of the PDSE;

interrupting the search for the storage location of the member in the set of PDSE indexes in response to determining the storage location of the member in the set of quick indexes prior to determining the storage location of the member in the set of PDSE indexes; and interrupting the search for the storage location of the member in the set of quick indexes in response to determining the storage location of the member in the set of PDSE indexes prior to determining the storage location of the member in the set of quick indexes, wherein the storage controller includes a faster operational speed than the set of long-term storage devices.

12. The method of claim 11, wherein managing the set of quick indexes comprises:

determining cache miss counts for the members of the PDSE;

selectively adding members of the PDSE to and selectively deleting members of the PDSE from a cache memory in the storage controller based on the cache miss counts;

adding to the quick index a respective reference to a storage location for each member of the PDSE added to the cache memory; and deleting from the quick index the respective reference to the storage location for each member of the PDSE deleted from the cache memory.

13. The method of claim 11, further comprising:

in response to not determining the storage location via the set of quick indexes:

ceasing to search the set of quick indexes for the storage location, and continuing to search the set of PDSE indexes to determine the storage location of the member.

14. The method of claim 11, wherein the storage device on the storage controller comprises a cache memory device.

15. The method of claim 14, wherein the set of long-term storage devices comprises one or more of:

a direct-access storage device (DASD);
a flash memory device;
a dynamic random-access memory (DRAM) device;
an enhanced DRAM (EDRAM);
a static random-access memory (SRAM) device;
a hard disk drive (HDD);
a near-line drive; and
a tape drive.

16. A computer program product comprising a computer-readable storage medium including program instructions embodied therewith, the program instructions executable by a processor to cause the processor to:

manage a set of quick indexes in a memory device on a storage controller, the set of quick indexes including references to storage locations for a subset of members of a partitioned data set extended (PDSE) that includes a plurality of members stored in a set of long-term storage devices;

receive an input/output (I/O) request directed to a member of the PDSE;

in response to the I/O request:

search the set of quick indexes to determine whether the member of the PDSE is included in the subset of members of the PDSE, determine a storage location for the member of the PDSE in response to determining that the member of the PDSE is included in the subset of members of the PDSE, and search a set of PDSE indexes including references to storage locations for all of the members of the PDSE, in parallel with searching the set of quick indexes, to determine the storage location for the member of the PDSE;

interrupt the search for the storage location of the member in the set of PDSE indexes in response to determining the storage location of the member in the set of quick indexes prior to determining the storage location of the member in the set of PDSE indexes; and interrupt the search for the storage location of the member in the set of quick indexes in response to determining the storage location of the member in the set of PDSE indexes prior to determining the storage location of the member in the set of quick indexes, wherein the storage controller includes a faster operational speed than the set of long-term storage devices.

17. The computer program product of claim 16, wherein the program instructions for managing the set of quick indexes comprise program instructions that further cause the processor to:

determine cache miss counts for the members of the PDSE;

selectively add members of the PDSE to and selectively delete members of the PDSE from a cache memory in the storage controller based on the cache miss counts;

add to the quick index a respective reference to a storage location for each member of the PDSE added to the cache memory; and delete from the quick index the respective reference to the storage location for each member of the PDSE deleted from the cache memory.

18. The computer program product of claim 16, wherein the program instructions further cause the processor to:

in response to not determining the storage location via the set of quick indexes:

cease searching the set of quick indexes for the storage location, and continue searching the set of PDSE indexes to determine the storage location of the member.

19. The computer program product of claim 16, wherein the storage device on the storage controller comprises a cache memory device.

20. The computer program product of claim 19, wherein the set of long-term storage devices comprises one or more of:

a direct-access storage device (DASD);
a flash memory device;
a dynamic random-access memory (DRAM) device;
an enhanced DRAM (EDRAM);
a static random-access memory (SRAM) device;
a hard disk drive (HDD);
a near-line drive; and
a tape drive.

* * * * *